United States Patent [19]

Clark

[11] 3,707,786
[45] Jan. 2, 1973

[54] METHOD AND MEANS OF PRESENTING A PLANETARIUM DISPLAY

[76] Inventor: William T. Clark, P. O. Box 885, Jackson, Miss. 39505

[22] Filed: Feb. 5, 1968

[21] Appl. No.: 703,009

[52] U.S. Cl. ................................................. 35/42.5
[51] Int. Cl. ........................................... G09b 27/00
[58] Field of Search .......................... 35/42.5, 45, 47

[56] References Cited

UNITED STATES PATENTS

| | | | |
|---|---|---|---|
| 1,693,969 | 12/1928 | Villiger et al. | 35/42.5 |
| 3,303,582 | 2/1967 | Farquhar | 35/47 |
| 1,616,736 | 2/1927 | Bauersfeld | 35/42.5 |
| 2,477,027 | 7/1949 | Wenberg | 35/42.5 UX |
| 2,483,216 | 9/1949 | Marshall | 35/42.5 |
| 2,632,359 | 3/1953 | Spitz | 35/42.5 |
| 2,803,165 | 8/1957 | Sargenti | 35/42.5 |
| 2,885,791 | 5/1959 | Gunning | 35/47 UX |
| 3,074,183 | 1/1963 | Frank | 35/42.5 |
| 3,250,024 | 5/1966 | Douthitt et al. | 35/42.5 |
| 3,256,619 | 6/1966 | Frank | 35/42.5 |

Primary Examiner—Jerome Schnall
Attorney—Clarence A. O'Brien and Harvey B. Jacobson

[57] ABSTRACT

The provision of a planetarium projector provided with a near-point light source for the projection of the star images and including means for mounting, and maintaining, a star projection sphere concentric with the underside of a hemispherical dome within which the projector means is operatively positioned, to provide a highly realistic, accurate reproduction of the heavens as they appear from a given observation point upon the surface of the earth. The planetarium projector means also includes optical projection means for the sun, moon and planets which includes means for eliminating parallax from these projectors due to their somewhat non-concentric placement relative to the projection dome. Still further, the utilization of a point light source provided with means for decreasing the intensity of the lamp toward that portion thereof responsible for the projection of the fixed star images in the equatorial regions of the projection dome provides a unique method of presenting a planetarium display characterized by a high degree of realism in the projected night sky.

3 Claims, 10 Drawing Figures

PATENTED JAN 2 1973

3,707,786

William T. Clark
INVENTOR.

BY *Clarence A. O'Brien*
*and Harvey B. Jacobson*
Attorneys

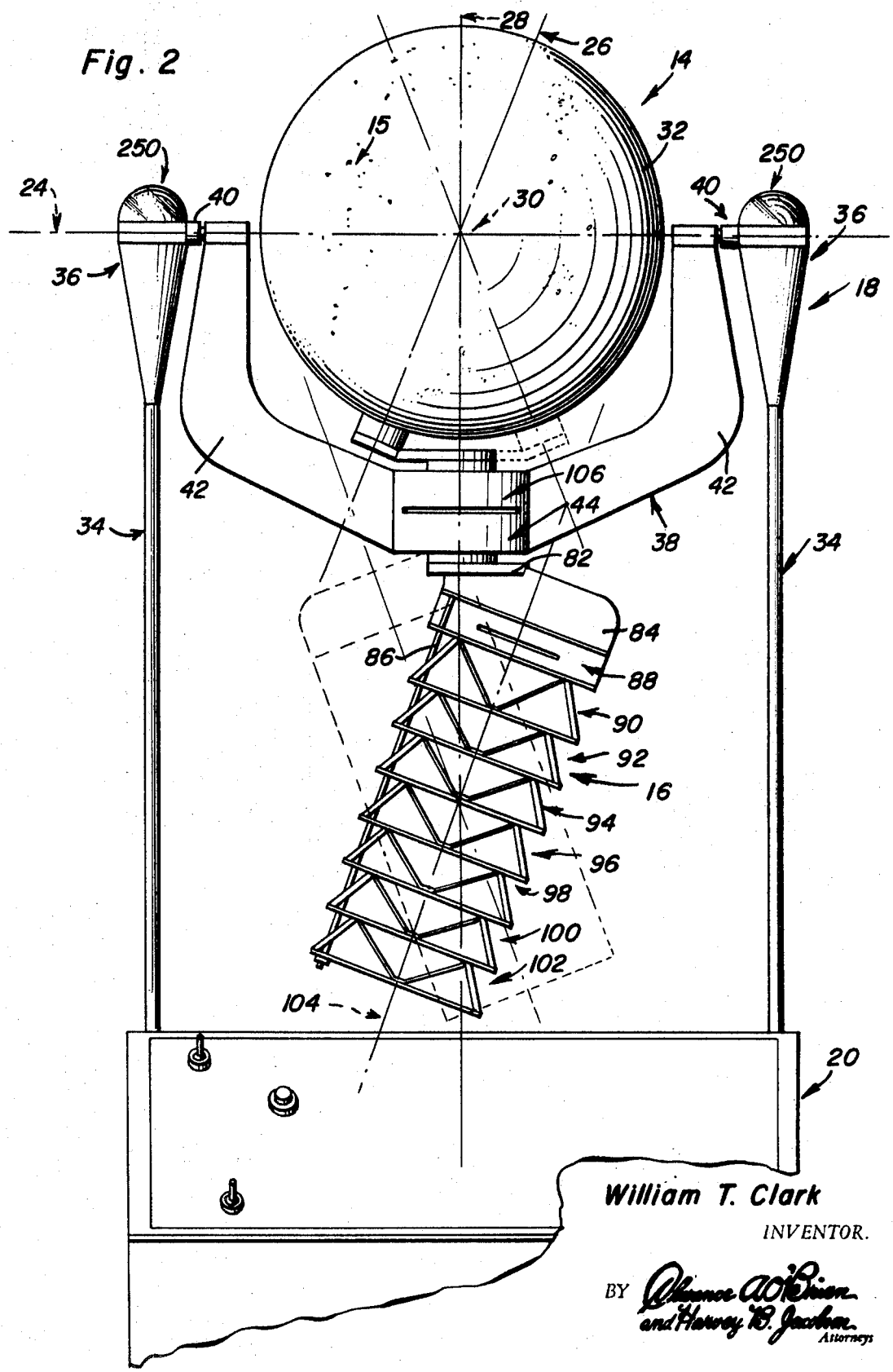

William T. Clark
INVENTOR.

PATENTED JAN 2 1973

William T. Clark
INVENTOR.

BY *Clarence A. O'Brien*
*and Harvey B. Jackson*
Attorneys

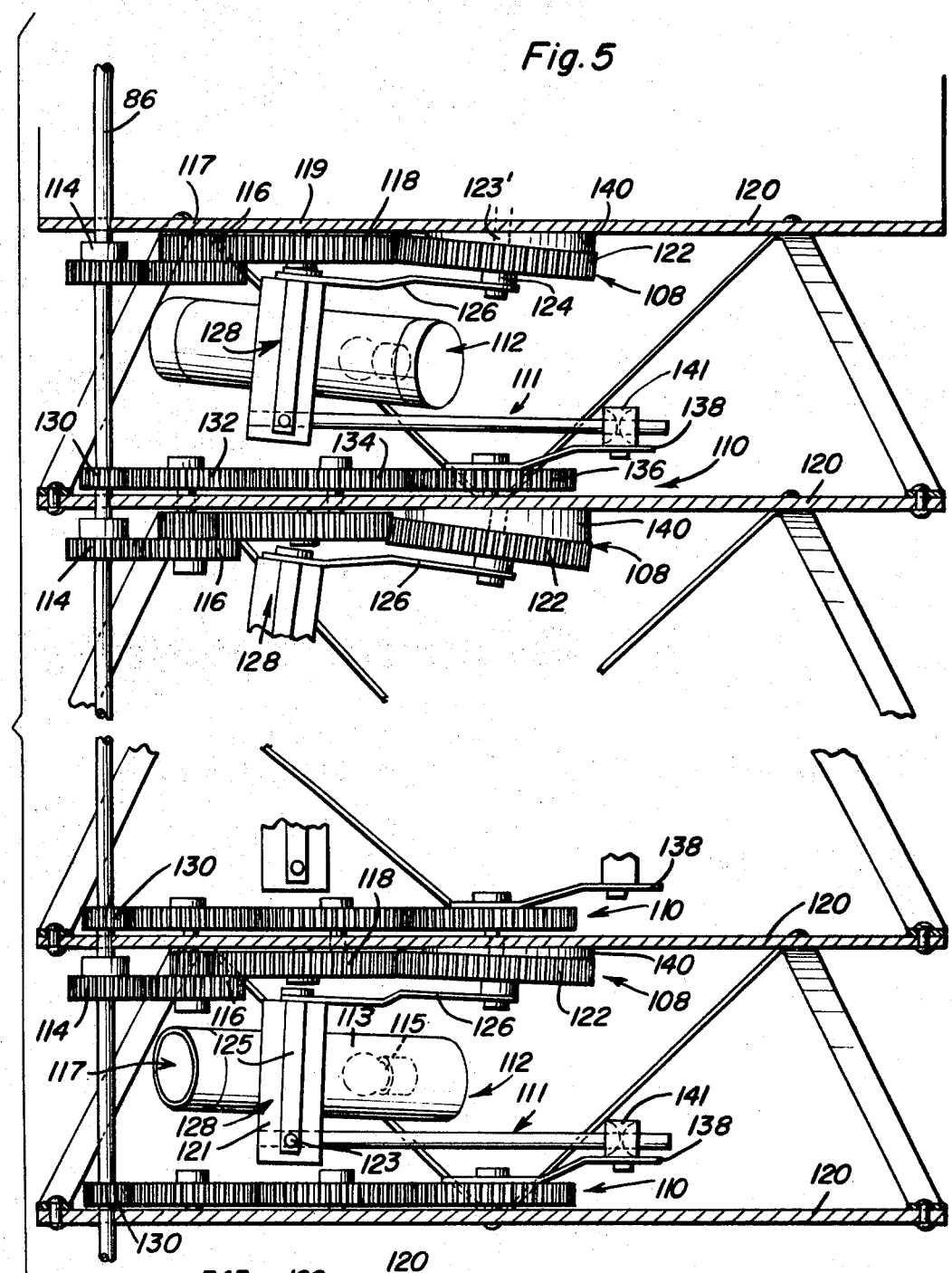

METHOD AND MEANS OF PRESENTING A PLANETARIUM DISPLAY

The present invention relates to a method of presenting a planetarium display with a point light source, pin-hole fixed star projection means. More particularly, the present invention relates to the provision of a method and means for presenting a highly realistic, accurate planetarium display by the utilization of a point light source pin-hole fixed star projector means wherein the point light source is disposed concentric to the projection dome.

Planetarium projectors provided heretofore generally incorporate an incandescent light source for the projection of the images of the fixed stars by either a pin-hole projection or optical light ray condensing projection techniques or a combination of the two techniques. It is well appreciated that both projection techniques have inherent shortcomings. First of all, if pin-hole projection techniques are utilized in conjunction with an incandescent light source, images of the stars projected onto the projection dome are simply enlarged images of the finite incandescent filament of the light source. Furthermore, to achieve the degree of starbrightness required for the average planetarium display, the filament size of the incandescent light source must, of necessity, be increased to the point that the images representing the bright stars would be too large inasmuch as they consist of images of the necessarily large filament itself. Some planetarium projector means provided heretofore have compromised in an attempt to overcome the aforementioned inherent disadvantage of the relatively inexpensive incandescent light source pin-point projection means, by utilizing the pin-hole means for the less brilliant stars and optical, lens system, means for the projection of the brighter stars from incandescent light sources. Still further, in the more complex planetarium projectors provided heretofore, the projection of the fixed stars is achieved by optical projection means solely. However, the utilization of optical projection means solely greatly increases the size and cost of the planetarium projector. On the other hand, the attempts have been made heretofore to utilize arc light sources in planetarium projectors in an attempt to eliminate the necessity of optical projection means while overcoming the inherent disadvantages of the pin-hole projection of star images by utilization of a light source having a finite incandescent filament. However, such prior art attempts are characterized by extremely complex light sources which are so expensive to construct, operate and maintain so as to substantially negate any advantages derived from their utilization.

Still further, on the one hand, highly complex planetarium projectors provided heretofore are generally characterized by a high degree of accuracy, where on the other hand, their less complicated counterparts, in an attempt to simplify the construction thereof, has resulted in the introduction of gross error particularly with regard to the projected images of the fixed stars, so as to render planetarium displays produced by such "simplified" prior art projectors highly unsuitable as astronomical teaching aids whereby they are of little use other than for the presentation of a merely entertaining show.

It is an object of the present invention to provide an improved construction for a planetarium projector utilizing a pin-hole fixed star projection technique.

Another object of the present invention is to provide a novel near point arc light source for planetarium projectors.

A further object of the present invention is to provide a novel method of presenting a planetarium display wherein all stars and nebulae assume their correct positions, appearing to be point sources, and wherein the relative brightness of stars, i.e., the diminishing of the brilliance of the stars near the horizon, is extremely realistically reproduced.

Still a further object of the present invention is to provide a novel method and means of representing a highly accurate planetarium display whereby a fixed star projector means is concentrically disposed relative to a projection dome so as to assure that all stars and nebulae projected thereby assume their correct positions without any significant inaccuracy due to the off-center fixed star projection means utilized heretofore.

A still further object of the present invention is to provide for the elimination of parallax from planet projectors comprising a portion of a planet projection means of a planetarium projector.

Still a further object of the present invention is to provide novel means for selectively energizing and deenergizing the planet projectors of a planetarium projector means.

These together with other objects and advantages which will become subsequently apparent reside in the details of the method of the present invention and the projector and lamp means used therein as more fully hereinafter described and claimed, reference being had to the accompanying drawings forming a part hereof, wherein like numerals refer to like parts throughout, and in which:

FIG. 2 is a somewhat schematic front elevational view of the planetarium projector of FIG. 1;

FIG. 5 is an enlarged fragmentary side elevational view of the optical projection means utilized to project the images of the sun, moon and planets;

FIG. 10 is a fragmentary side elevational view of still another planet projector carrier means.

Briefly, the present invention provides a method and means of presenting a planetarium display of a high degree of realism and accuracy by the novel placement of a planetarium projector means provided with a novel near-point light source, consisting of an enclosed concentrated-arc lamp providing a near-point source of light of a dimension generally in the order of approximately 0.03 inches, or less, to achieve a full range of projected star brilliance corresponding to the natural night sky and wherein all of the projected star images appear to be point source, i.e., images of the intensely bright projected arc, differentiated only in apparent brightness wherein disks of light or fuzzy, indistinct images of a projected finite filament are noticeably absent. The star projector within which the aforementioned concentrated-arc light source is contained, is positioned concentrically relative to the projection dome whereby and wherein the latitude, precession and diurnal axes of the fixed-star projector intersect at the near-point concentrated-arc light source. In addition, the planetary projection means of the present planetarium projector is provided with an appropriate number of individual optical projectors, each utilizing its own incandescent light source and optical, i.e., lens system, light ray condensing means, each provided with optical projector carrier means readily facilitating adjustment of each optical projector to compensate for parallax introduced by the non-concentric placement of the optical projectors relative to the center of the projection dome.

Still further, the invention contemplates a novel method of presenting a highly realistic planetarium display wherein the relative brilliance of the natural appearance of stars in the area of the zenith region, of the projection dome, as opposed to the somewhat diminished brilliance of the stars in the region of the horizon, is realistically reproduced, which method also includes a simplified means of simulating conditions within the planetarium which correspond to the conditions of daylight, twilight, night, dawn, and back to daylight.

Figure 1:
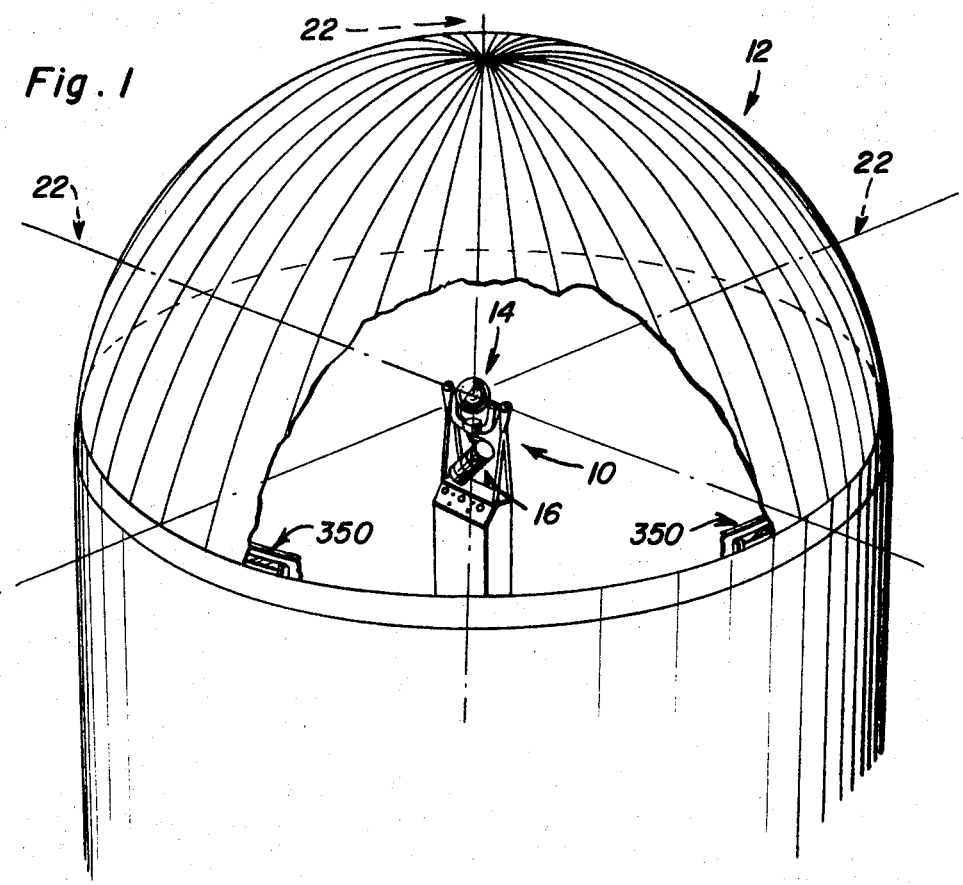
FIG. 1 is a perspective view of the planetarium projector means of the invention operatively positioned within a projection dome, further showing the fixed-star projection means of the projector concentrically disposed relative to the projection dome.

Referring now to the drawings and FIG. 1 in particular, a planetarium projector means 10 is shown operatively positioned within a projection dome 12 of conventional construction. It will be understood that the projection dome 12 is merely exemplary and that the planetarium projector means 10 may be utilized in conjunction with an observatory dome of generally hemispherical configuration characterized by a relatively unobstructed underside. The planetarium projector means 10, as best seen from a simultaneous consideration of FIGS. 1, 2 and 3, basically comprises a fixed-star projector means 14 having a multitude of pin-holes as at 15 and a planetary projector means 16 carried by a planetarium projector support means 18 rigidly secured to a control console and support pylon indicated generally at 20. As will be seen best from FIG. 1, and particularly the phantom line radii shown therein, the fixed-star projector means 14, and more specifically the near-point light source therein, is positioned concentric to the projection dome 12, i.e., at the intersection of the radii. Which radii are indicated generally at 22.

Figure 3:
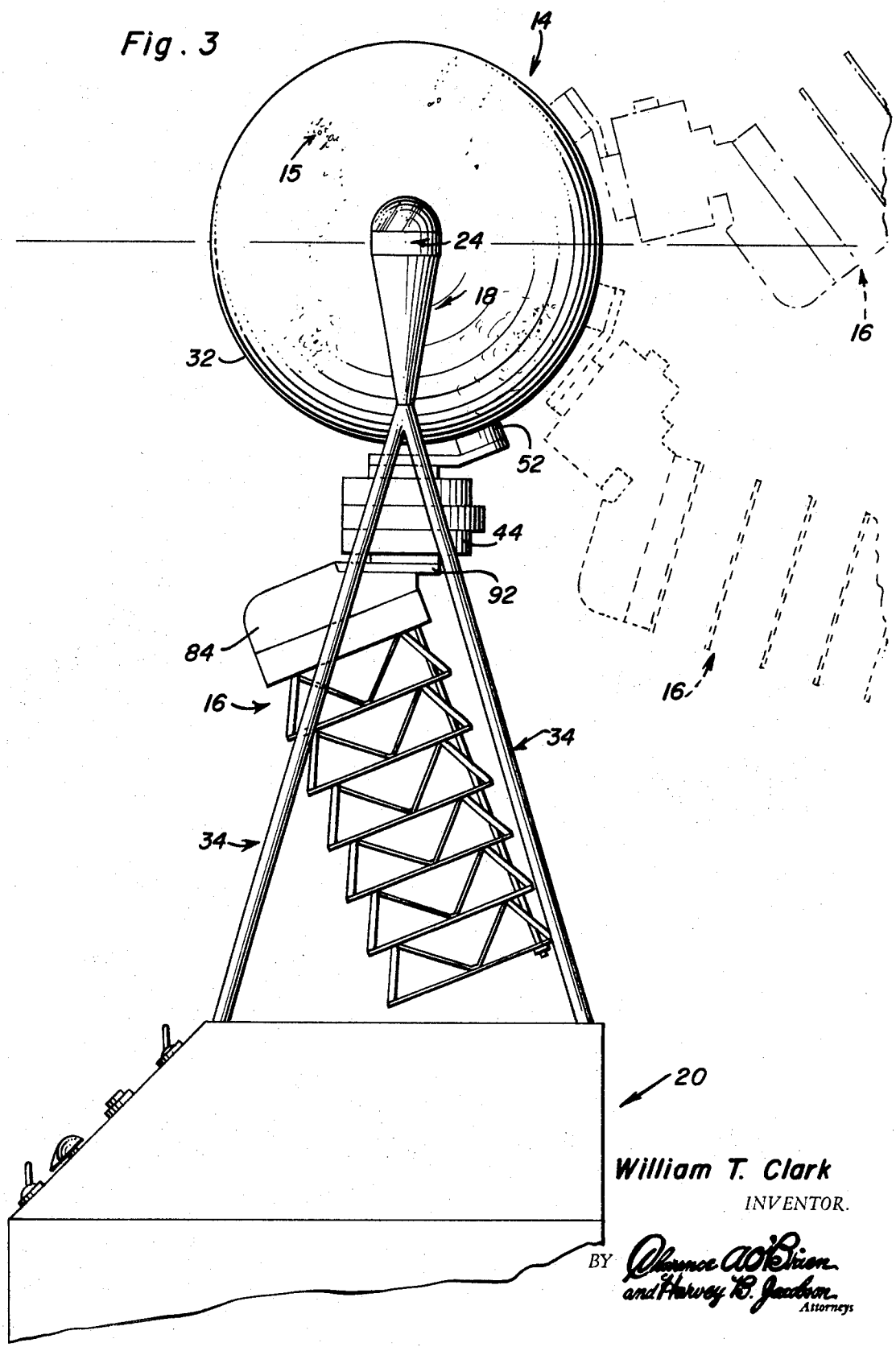
FIG. 3 is a somewhat schematic side elevational view of the projector means, further showing in phantom lines the alternative position of certain components of the projector means when adjusting the projector means for changes in latitude.
Figure 4:
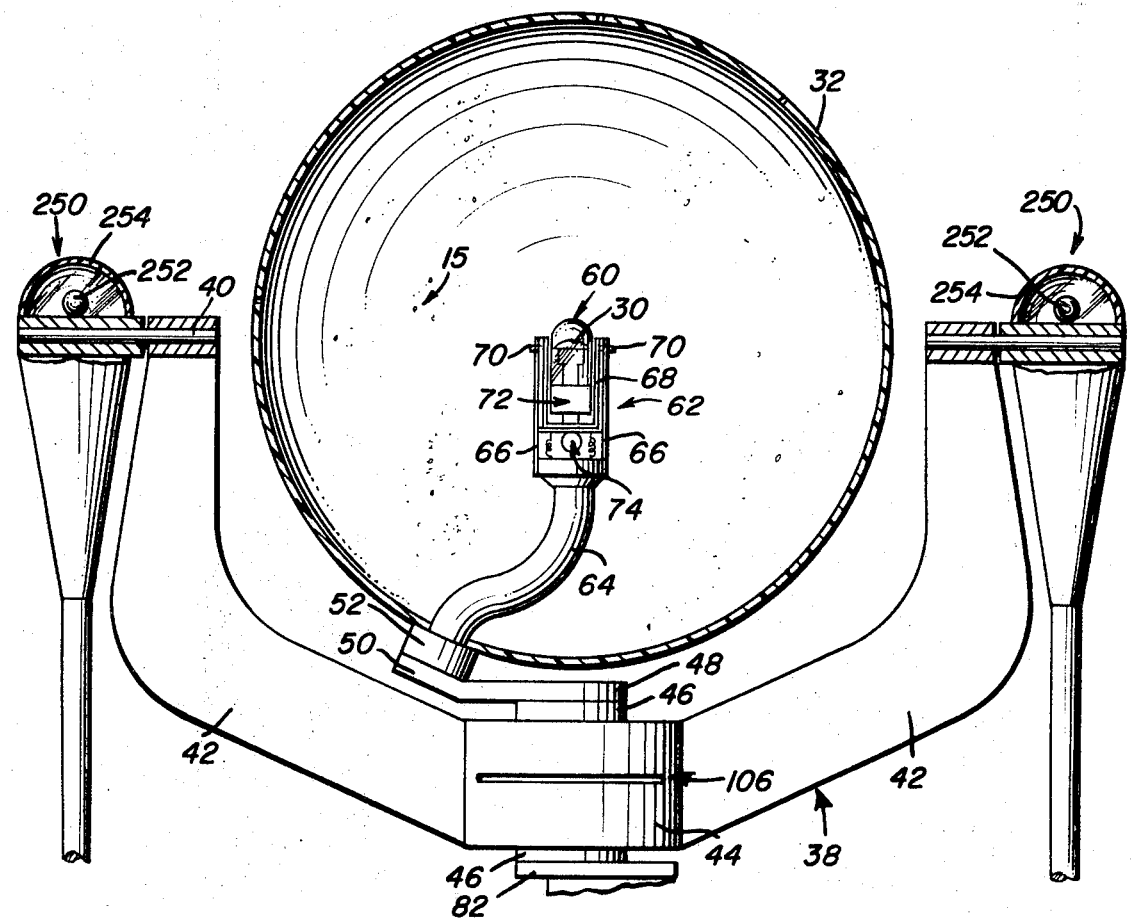
FIG. 4 is an enlarged cross-sectional view of the fixed star projector of the planetarium projector means with the light source therein shown in elevation.

As seen best from a simultaneous consideration of FIGS. 2, 3 and 4 the fixed-star projector means 14 is adapted for precise rotation on its latitude axis 24, precession axis 26 and diurnal axis 28 which axes intersect at a point indicated generally at 30 within the interior of the fixed-star projector means 14, which coincides with the concentrated arc point light source provided therein. Thus, it will be appreciated that as the fixed-star projector means 14 is rotated or oscillated about the aforementioned axes 24, 26 and 28 that the concentrated-arc light source coinciding with the spatial point 30 will constantly remain concentric relative to the intersection of the radii 22.

To accomplish the concentric rotational placement of the fixed-star projector means 14, which in the exemplary embodiment illustrated in FIGS. 1–4 comprises a hollow sphere 32 the planetarium projector support means 18 includes a pair of bifurcated upstanding bracket members 34 provided with shaft journal means 36 adjacent the top thereof within which is rotatably journalled a yoke means 38 consisting of horizontally disposed shaft means 40 secured to the arms 42 of the yoke means 38 and journalled in the means 36 for rotation of the yoke means about the latitude axis 24. In FIG. 3 it will be seen that the fixed-star projector means 14 and the planetarium projector means 16 are shown in successive rotational positions prescribed about the latitude axis 24.

The journal means 36 will thus be understood to include a manual or power operated means for selectively positioning the yoke assembly 38 about the latitude axis 24. The yoke assembly 38 further includes a diurnal motor housing 44 for supporting a diurnal motion shaft 46 having its axis of rotation coinciding with the diurnal axis 28. The precession axis arm 48 fixed to the diurnal shaft 46 generally normal thereto includes an outwardly disposed portion 50 which supports a precession axis shaft 52 having an axis of rotation coinciding with the precession axis 26, which it is understood deviates 23½° from the diurnal axis 28 so as to rotate the fixed-star sphere 32 around the precession axis 26 in order that the planetary projector means 10 can display a complete cycle of approximately 26,000 earth years. Thus, and as best seen in FIG. 4, the fixed-star sphere 32 is fixed to the precession axis shaft 52 and it will be understood that although not normally required an appropriate drive means, not shown, may be provided to rotate the sphere 32 about the precession axis 26 as the diurnal drive means 44 rotates both the sphere 32 and the planetary projector means 16 about the diurnal axis 28. As seen best in FIG. 4, an enclosed concentrated-arc light source indicated generally at 60, such as comprising a zirconium arc lamp for example, is supported in a pendulum light support means 62 including a light support arm 64 fixed relative to the precession axis shaft 52 for rotation therewith, and provided with upstanding support brackets 66 within which, in pendulum fashion, is supported a yoke means 68 by means of pivot means 70. The yoke means 68 further includes an arc lamp mounting socket 72 connected to a suitable source of starting and energizing current for the lamp 60, generally provided in the control console 20. The lamp support yoke 68 further includes weight means 74 to insure that the lamp 60 remains in a substantially upright position, as illustrated in FIG. 4, or during rotation of the device 10 about the latitude axis 24, as shown in FIG. 3.

Figure 6:
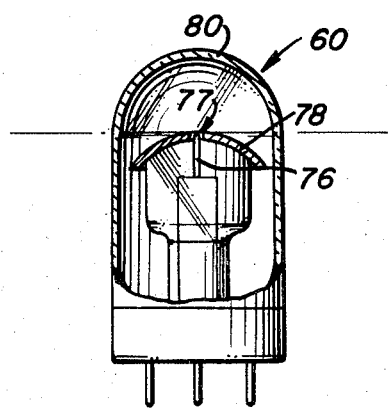
FIG. 6 is an enlarged medial fragmentary cross-sectional view of the arc light source of the fixed-star projector.

Referring now to FIG. 6 it will be seen that the lamp 60 consists of an enclosed concentrated-arc lamp such as is characterized by a zirconium cathode 76, projecting upwardly with an aperture 77 at the zenith of a convex anode shield 78 wherein suitable energization of the lamp 60 establishes a brilliant light emitting arc between the zirconium element 76 and the anode shield 78 thus providing a near-point light source which when operatively positioned within the device of the present invention preferably coincides with the spatial point 30 corresponding to the center of the projection dome within which the device is utilized. The lamp 60 is preferably also provided with a hemispherical envelope end portion 80 which coacts with the convex anode shield 78 so that illuminating light will decrease downwardly along the vertical axis, running longitudinally through the zirconium cathode 76, or zenith of the envelope end portion 80, which illumination decreases downwardly from the zenith in accordance with a cosine curve whereby fixed star images projected on the horizon of the projection dome 12 are not as bright as those projected at the zenith of the dome 12. In addition, it will be noted that the zirconium cathode 76 projects upwardly within the through aperture 77 at the zenith of the convex anode 78 and wherein the uppermost end of the cathode 76 terminates just short of the upper surface of the anode 78 and wherein the zenith of the anode shield 78 coincides with an equatorial plane through the hemispherical envelope portion 80 of the lamp 60.

It has been noted that the aforedescribed construction of the arc lamp 60 is generally necessary to carry out the objects of the present invention.

Figure 9:
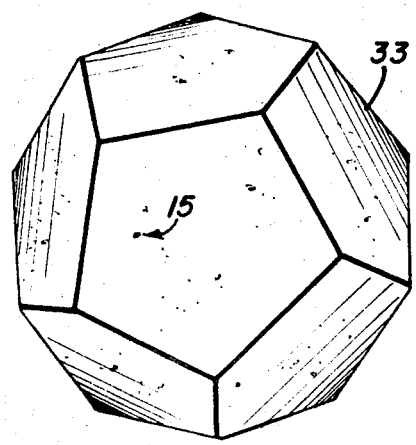
FIG. 9 is a perspective view of a polygonal, specifically dodecahedral, fixed star projector means.

The fixed-star projector sphere 32 may, for example, comprise a sphere having a 12-inch radius and may for example have a total of somewhat more than 1,000 holes drilled therethrough, ranging in size from 0.0520 inch to 0.0135, inch for example, to accomplish the pin-point projection of fixed stars and nebulae corresponding in brilliance to the actual star brilliance. As seen in FIG. 9, the fixed-star projector means 14 need not necessarily include a spherical housing 32 but may generally comprise any hollow regular geometric form, such as dodecahedron 33 illustrated. In addition, although not shown, the present invention also encompasses the utilization of dual projectors, i.e., two generally hemispherical pin-hole projection members, each having an enclosed-arc light source. In this regard, it will be appreciated that the dual projector concept comprises an improvement over the extremely complex dual star projector means presently utilized in the more complex and costly planetarium display projection means.

Referring once again to FIGS. 2, 3 and 4 with particular regard to the diurnal drive means 44, and the planetary projector means 16, it will be seen that the diurnal axis rotational shaft 46 driven by a motor means, not shown, within the diurnal drive housing 44 includes a downwardly disposed eccentric arm 82 which carries the planetary projector means 16 and includes a planetary projector drive means 84 including a suitable drive motor, not shown, which drives a drive shaft 86 common to all the planetary cages provided for each of the planetary projectors to be described hereinafter. As indicated hereinbefore the planetary projector means 16 generally rotates about the diurnal axis 28. In addition, the planetary cages, comprising the ecliptic projector 88, moon projector 90, Mercury projector 92, Venus projector 94, Mars projector 96, Jupiter projector 98, Saturn projector 100, and sun projector 102 generally rotates about a planetary projection axis 104 having an angle of 23½° relative to the diurnal axis 28 and generally parallel to the axis 26, and wherein the drive shaft 86, comprising the output shaft of the planetary drive means 84, provides drive means for each of the aforementioned projectors by means to be described hereinafter. In addition, an equator projector 106 preferably comprises a part of the diurnal drive means 44. From the foregoing, it will be apparent that in the broad sense, that the equator and ecliptic projectors as well as the moon, sun and planet projectors are somewhat analogous to those conventionally provided in prior art planetarium projector means. However, as will become apparent, the aforementioned projectors in the device 10 of the present invention, are characterized by novel mounting, drive and parallax elimination adjustment means.

In this regard, and referring now first to FIG. 5 comprising exemplary details of the planetary gear means 108 and earth gear means 110 typical of the sun, moon and planet projector cages, somewhat schematically shown in FIGS. 2 and 3, wherein due to scalar limitations only the support plate for each of the planetary cages is shown. In setting forth the exemplary "similarity" of the planetary gear means 108 it is not meant to imply that the planetary gear means for each of the planetary projectors is identical inasmuch as the celestial path and speed of each differs. However, and as will become apparent hereinafter, each of the aforementioned planetary projectors is characterized by analogous novel constructional features. Although the motions of the planetary projectors are quite intricate, extreme accuracy is achieved by driving the sun, moon and planetary projectors from the common drive shaft 86. In addition, the gear ratios utilized, for each of the planetary gear means 108 is geared to the fourth significant integer. For example, the period of the planet Mars is approximately 1.880 earth years; and in the planetarium projector means 10 illustrated the scale is 1.875. In addition, as will become apparent hereinafter, the sun, moon, and planetary projectors each include adjustment means in order to permit the correction of periodic slight errors that may arise.

Referring now more specifically to the planetary gear means 108 and their associated earth gear means 110, to correlate the movement of the projected sun, moon and planet images relative to the earth, and, their associated optical projector means 112, it will be understood that with the planetary revolution of the earth being 1 the planetary gear means 108 of each of the planetary projectors will comprise a ratio revolution of 0.4152 for the Mercury projector 92; 1.625 for the Venus projector 94; 1.875 for the Mars projector 96; 11.82 for the Jupiter projector 98; and 29.45 for the Saturn projector 100. Thus, an exemplary gear drive 108 comprises a drive gear 114 carried by and fixed relative to the planetary drive shaft 86 with a plurality of appropriately sized idler gears 116 and 118 carried on stub shafts 117 and 119 respectively, secured to their respective planetary cage mounting plate 120, drive a planetary gearing output gear 122 having an integral downwardly depending shaft 124 to which is fixed a planetary projector support arm 126 provided with a projector support carrier means indicated generally at 128 which in addition to be rotated under the influence of the support arm 126 is also simultaneously rotated in a compound motion by the associated earth gear means 110 and its associated guide arm indicated generally at 111. As does the planetary gear means, the earth gear means 110 includes a drive gear 130 carried by and fixed relative to the planetary drive shaft 86, intermediate gears 132 and 134 which ultimately drive the gear 136 to which is fixed the earth guide arm drive lever 138. It will be understood, of course, that the gear ratio of each of the earth gear means 110 is identical.

Inasmuch as the angular relationship of the orbit of each of the planets differ with respect to each other and the precession axis of the earth or the longitudinal axis of the planetary projector means 16, which as was discussed hereinabove, are both inclined 23½° relative to the diurnal axis 28. Accordingly, a predetermined inclination of the plane of rotation of the respective projector support arms 126 is introduced by the placement of angular shim 140 affixed relative to its contiguous planetary cage plate member 120 whereby the associated gear 122 rotates about its associated stub shaft 123' at an angle which deviates the predetermined number of degrees from the planetary axis 104. Thus, as seen in FIG. 5 the angular shim members 140 of the two complete planetary projector cages shown and the fragmentary projector means shown are of varying thickness and therefore effect varying inclination of their associated projector support arms 126.

Figure 7:
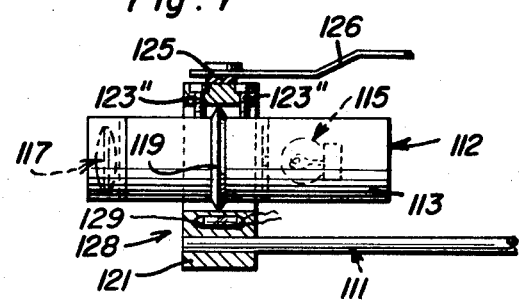
FIG. 7 is a vertical cross-sectional view through one embodiment of a support ring for the optical planet projectors.

With further regard to the optical projectors 112 each comprises a tubular barrel 113 provided with an incandescent light source 115 and a light condensing lens system 117. As seen best in FIG. 7 intermediate the ends thereof, the tubular member 113 is provided with an annular rib 119, such as comprising an integral annular ring, O-ring engaged thereabout, etc. The annular rib 119 is received within a projector carrier member 121, which as seen in FIG. 5, is pivotally carried as at 123 by a yoke 125 carried by its respective projector support arm 126, which carrier member 121 fixedly receives one end of the earth guide arm 111 at a point therein corresponding to the intersection of the pivotal axis 123 and the axis of the securement of the yoke 125 to the member 126. Furthermore, parallax elimination means is provided in the carrier member 121 by the provision of a pair of setscrews 123'' threadably received in threaded-through apertures in the carrier member 121 so as to adjustably bear against the tubular member 113 at points longitudinally spaced from the annular rib 119 whereby by selectively tightening the setscrews 123'' disproportionately the projector 112 may be selectively disposed at an angle other than normal to the vertical axis provided by the yoke 125 whereby the position of the sun, moon or planetary image impinging on the projection dome 12 may be adjusted to eliminate parallax introduced by the non-concentric placement of the planetary cages with respect to the projection dome 12. Alternatively, although not shown, the parallax elimination means could comprise an inwardly projecting annular ring integral with or carried by the carrier member 121 rather than the tubular member 113.

In addition, the projector carrier means 128, more specifically the carrier member 121, is preferably provided with an angularly responsive electrical switch means, i.e., a mercury switch 129, whereby as its associated planetary projector 112 dips below the horizon of the projection dome 12 the associated incandescent light means 115 is deenergized.

Figure 8:
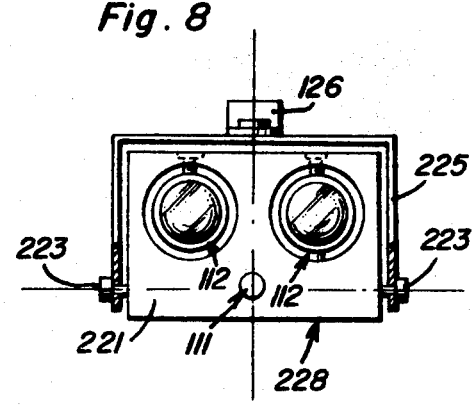
FIG. 8 is a front elevational view of another embodiment of a planet projector carrying means.

Referring now to FIG. 8 it will be seen that the carrier member 121 of the projector carrier means 128 and including the yoke 125 may be replaced by an analogous projector carrier means 228 provided with optical projectors 112. Each of the projectors 112 in the carrier means 228 is aimed at the same point whereby the images are superimposed. This serves a twofold purpose, first in the event of the burn-out of one lamp the other will generally continue to operate, and secondly as the projectors sweep past the support rods for the plates 120 at least one of the projected images will not be blocked. Thus, it will be seen that the dual projector means 228 includes a carrier 221 yoke 225 carried by the associated support 126 and pivoted to the carrier member 221 as at 223 in a manner analogous to the embodiment 128 whereby the earth guide arm 111 is fixedly secured to the carrier member 221 at a point corresponding to the intersecting axes of the yoke 225 and the pivotal means 223. Although not shown, it will be understood that the dual projector carrier means 228 may also be provided with an inclination responsive electric switch analogous to that illustrated with regard to the embodiment of FIG. 7.

Still further, and now referring to FIG. 10, it will be seen that another embodiment of projector 112 support means includes an off-set projector tube carrier member 321 and wherein in the embodiment shown in conjunction with an alternative construction of the Mercury projector, the primary support of the projector 112 is derived from a support arm 311 carried by the last driven gear 336 in the earth gear train 110 pivotally secured as at 337 to projector carrier mounting block 339 which in turn carries a planetary guide arm 339 adjustably received in a post 341 carried by the planetary guide arm 343 which is in turn integral with the last gear 122 in the planetary gear drive means 108 carried by a planetary projector cage support plate 120. Furthermore, although not mentioned hereinabove, the gears 116 of each of the respective planetary cages is spring-biased into the position shown on its associated stub shaft 117 whereby it may be biased downwardly to disengage it from its associated drive gear 114 and driven gear 118 so as to permit adjustment of the last gear 122 and thus the support arm 126, or conversely the arm 343, to facilitate adjustment of the projector 112 to compensate for accumulative rotational error, and the like which is introduced as discussed hereinabove. In addition, and as seen in FIG. 5, the operative connection between the first guide arm 138 and the first guide rod 111 as well as the operative connection between the planetary guide arm 339 and its associated post 341 include means whereby the respective rods 111 and 339 can be angulated with regard to the respective posts 141 and 341, as necessary by virtue of the non-parallel axes of the rotation of the arms 138 relative to the arms 126 or conversely the rotation of the arms 311 relative to the arms 343. Furthermore, it will also be appreciated that the posts 141 and 341 slidably engage their respective rods 111 and 339 due to the eccentric motion of their respectively arms 138 and 343 during planetary movement of their respective projectors 112.

While brief mention has been made heretofore to auxiliary devices associated with the basic means, i.e., fixed-star projection, as well as sun, moon and planet projection, the planetarium projector means 10 may further include as "accessories" special effect light means indicated generally at 250, such as associated with the yoke bearing assemblies 38 wherein the provision of incandescent light sources 252 in cooperation with transparent domes 254 permit the simulation of clouds, etc. by the utilization of appropriate light masks thereover or actual non-permanent marking of the dome 254 with a light opaque substance.

With more specific regard to the method of the present invention, it will be seen that FIG. 2 shows the planetary and projector means 10 with the planetary cages 16 in the lowest possible position. This configuration would be used to project or depict the night skies as seen by an observer from a location at the North Pole of the earth. Therefore, rotation of the means 14 and 16 about the diurnal axis 28 by the diurnal drive means 44 will simulate the diurnal, or daily, apparent motions of the earth. As further seen in FIG. 2, rotation of the means 14 and 16 by the diurnal drive means 44 does not effect the precessional displacement of the axes of the means 14 and 16, as shown in phantom lines. Referring now to FIG. 3, where for purposes of simplicity only an adjustment in latitude has been shown, thus no diurnal rotation, it can be seen that the projection means 14 remains concentric with the projection dome 12. Thus it will be seen that the brilliant point light source provided by the energized lamp 60 shines outwardly through the multitude of pin-holes in the exemplary sphere 32 to impinge upon the underside of the projection dome 12 as a corresponding multitude of points of light of brilliance proportionally corresponding to the relative size of the pin-hole associated therewith and wherein regardless of diurnal, precessional or latitude rotation of a sphere 32 the light source coinciding with the point 30 will each remain substantially uniformly spaced from the dome, i.e., concentric therewith, thereby providing a high degree of accuracy not possible with relatively simple planetarium projector means provided heretofore.

Furthermore, and as discussed hereinabove, the provision of an enclosed concentrated-arc lamp, as the lamp 60 characterized by the cathode, anode, hemispherical envelope shown, provides a highly realistic planetarium display wherein the relative apparent construction in the brightness of stars near the horizon diminishes as in nature. In this regard, it will be appreciated that in nature this apparent reduction of the brilliance of the stars near the horizon is caused by increased air mass toward the horizon of the earth through which an observer views the stars in that region. Considering the air mass toward the zenith of that portion of the sky being viewed, as one, or unity, the apparent brightness of two equally brilliant stars would be diminished by some 36 light diffusing, air masses. Therefore, it will be apparent that falling off a brilliance of natural stars toward the horizon is extremely close agreement with the cosine function of the light source 60, disclosed herein, thereby introducing a degree of realism not generally possible with relatively simplified planetarium projectors provided heretofore.

Although not discussed heretofore, it will be appreciated that the brilliance of incandescent light sources in star projector or planetarium projector means provided heretofore is controlled by a rheostat in order to vary the projected star brilliance, or intensity. However, as is well known, an arc lamp, such as the arc lamp 60 disclosed is either on or off, with no variation of brilliance in between. Thus, utilization of an arc lamp as disclosed would compensate for light scattering air masses, but wherein the stars are basically of the same brilliance facilitates carrying forth of a highly realistic planetarium display by selectively controlling incandescent lamps within the dome, such as comprising incandescent elongated lamps 350 placed about the periphery of the dome 12 as seen in FIG. 1 to change the relative illumination in the dome 12 whereby the varying of the lights 350 to correspond to conditions of daylight, twilight, night, dawn, and back to daylight to cause the stars to appear to be going through the cycle of invisibility to full brilliance as the sunsets.

The foregoing is considered as illustrative only of the principles of the invention. Further, since numerous modifications and changes will readily occur to those skilled in the art, it is not desired to limit the invention to the exact method, construction, and operation shown and described, and accordingly all suitable modifications and equivalents may be resorted to falling within the scope of the invention as claimed.

What is claimed as new is as follows:

1. In combination with a generally hemispherical projection dome, a planetarium projector including a star projector means concentrically disposed relative to the intersection of the radii of the dome which comprises yoke means supporting said star projector means, means supporting said yoke means for at least partial rotation about a generally normally horizontal axis, generally coinciding with an equatorial plane through said dome, a first shaft means carried by said yoke means, said first shaft means including a first output shaft means having a rotational axis normal to and intersecting said generally normally horizontal axis, an eccentric arm means carried by said first output shaft means for rotation therewith generally on a plane normal thereto, a second shaft means carried by said arm means at a point spaced from said rotational axis thereof and including a second output shaft means having a rotational axis inclined relative to the rotational axis of said first output shaft means a number of degrees approximating the inclination of the earth axis, the rotational axis of said second output shaft means intersecting said horizontal rotational axis of the yoke means and the rotational axis of the first output shaft means, said star projector means being carried by said second output shaft means for concentric rotation therewith with the point of intersection of the generally normally horizontal rotational axis of the yoke means, the normal rotational axis of the first output shaft means, and the inclined axis of said second output shaft means coinciding with the point of intersection of the radii of said projection dome, and said star projector means including light ray generating means mounted therein and coinciding with the point of intersection of the radii of the dome for projecting star images upon said planetarium projection dome, and planetary projection means carried by said first output shaft means for rotation therewith and disposed in generally diametrically opposed relation to said arm means, said planetary projection means having an inclined longitudinal axis generally parallel to the rotational axis of said second output shaft means, said planetary projection means including a plurality of planetary projectors each including means rotatably driving them generally about the longitudinal axis of said planetary projection means and on a plane generally normal thereto.

2. The planetarium projection of claim 1 wherein at least one of said plurality of planetary projectors includes means for selectively inclining said at least one of said plurality of planetary projectors relative to said longitudinal axis of said planetary projection means to generally eliminate parallax of the images projected thereby brought about by the generally non-concentric placement of said planetary projection means relative to said star projector means.

3. In combination with a generally hemispherical projection dome, a planetarium projector including a star projector means concentrically disposed relative to the intersection of the radii of the dome which comprises yoke means supporting said star projector means, means supporting said yoke means for at least partial rotation about a generally normally horizontal axis, generally coinciding with an equatorial plane through said dome, a first shaft means carried by said yoke means, said first shaft means including a first output shaft means having a rotational axis normal to and intersecting said generally normally horizontal axis, an eccentric arm means carried by said first output shaft means for rotation therewith generally on a plane normal thereto, a second shaft means carried by said arm means at a point spaced from said rotational axis thereof and including a second output shaft means having a rotational axis inclined relative to the rotational axis of said first output shaft means a number of degrees approximating the inclination of the earth axis, the rotational axis of said second output shaft means intersecting said horizontal rotational axis of the yoke means and the rotational axis of the first output shaft means, said star projector means being carried by said second output shaft means for concentric rotation therewith with the point of intersection of the generally horizontal rotational axis of the yoke means, the normal rotational axis of the first output shaft means, and the inclined axis of said second output shaft means coinciding with the point of intersection of the radii of said projection dome, and said star projector means including light ray generating means mounted therein and coinciding with the point of intersection of the radii of the dome for projecting star images upon said planetarium projection dome, said light ray generating means comprising an enclosed concentrated-arc light source providing near-point source illumination, said enclosed concentrated-arc light source including cathode means, convex anode means and a generally hemispherical enclosure end portion having an equatorial region disposed on a plane normal to the zenith of said anode shield, said cathode means being operatively positioned relative to said anode shield generally at the zenith thereof whereby the light intensity output characteristics of said light source diminishes in brilliance from the zenith of the generally hemispherical enclosure end portion toward the equatorial region of said generally hemispherical enclosure end portion thereby providing a reduction of the brilliance of the stars near the horizon when projecting star images upon said planetarium projection dome.

* * * * *